March 9, 1937.  C. B. WITTSTRUCK  2,072,997
POWER TRIP FOR SHEAF RACKS
Filed Oct. 17, 1936  2 Sheets-Sheet 1

Inventor
Clayton B. Wittstruck,
By Lauritz Miller
Attorney

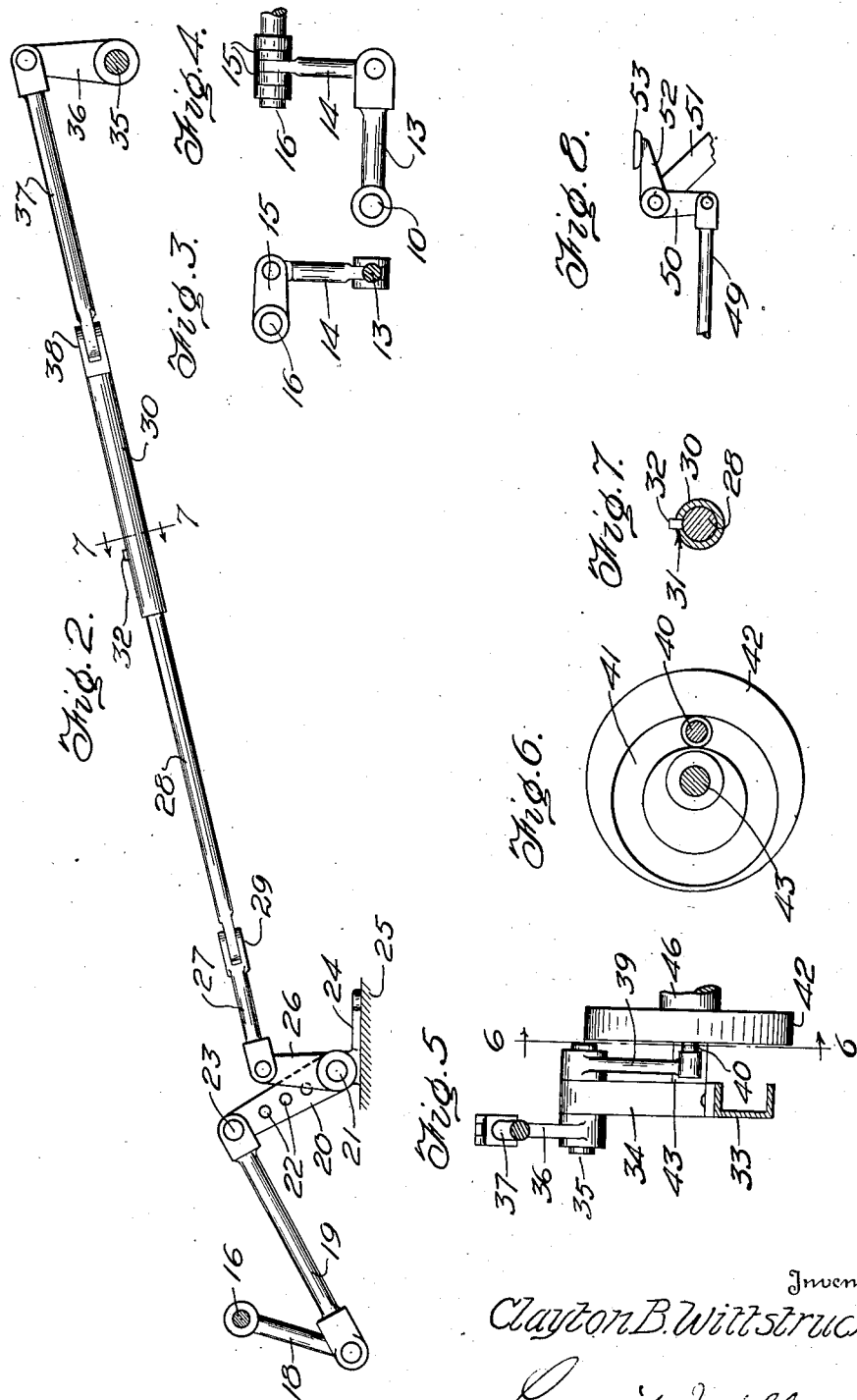

Patented Mar. 9, 1937

2,072,997

UNITED STATES PATENT OFFICE 2,072,997

POWER TRIP FOR SHEAF RACKS

Clayton B. Wittstruck, Ethan, S. Dak.

Application October 17, 1936, Serial No. 106,224

6 Claims. (Cl. 56—22)

This invention relates to agricultural implements and has special reference to a power trip for sheaf racks of tractor drawn binders.

Heretofore it has been common to use a hand lever or trip rope in connection with tractor drawn binders for dumping the sheaf rack from time to time. Such hand lever or rope is placed in such position on the tractor that the operator of the tractor may grasp the lever or rope and, by manipulating the same, dump the sheaf rack whenever he so desires. This operation requires that the operator removes one hand from the steering wheel of the tractor. Since it is necessary to dump the rack at frequent intervals it is practically necessary for the operator to have one hand off the steering wheel nearly, if not quite, all the time. This makes the steering of the tractor very laborious and also throws extra work on the operator.

The principal object of the present invention is to provide an improved sheaf rack dumping device extending from the binder to the tractor and there actuated by the power of the tractor, the operator controlling the connection of the trip and power by the simple and convenient method of stepping on a pedal or button so that both hands may be constantly used for steering the tractor.

A second important object of the invention is to provide a novel device of this character so arranged as to permit turning movement of the tractor relative to the binder without dumping the sheaf rack.

With the above and other objects in view, the invention consists in general of certain novel details of construction and combinations of parts hereinafter fully described, illustrated in the accompanying drawings, and pointed out in the appended claims.

In the accompanying drawings like characters of reference indicate like parts in the several views, and:—

Fig. 2 is an enlarged detail section on the line 2—2 of Fig. 1.

Fig. 3 is an enlarged detail section on the line 3—3 of Fig. 1.

Fig. 4 is a view of the parts shown in Fig. 3 and taken from the right side thereof.

Fig. 5 is an enlarged detail section on the line 5—5 of Fig. 1.

Fig. 6 is a section on the line 6—6 of Fig. 5.

Fig. 7 is a greatly enlarged section on the line 7—7 of Fig. 1.

Fig. 8 is an enlarged detail section on the line 8—8 of Fig. 1.

Figure 1:
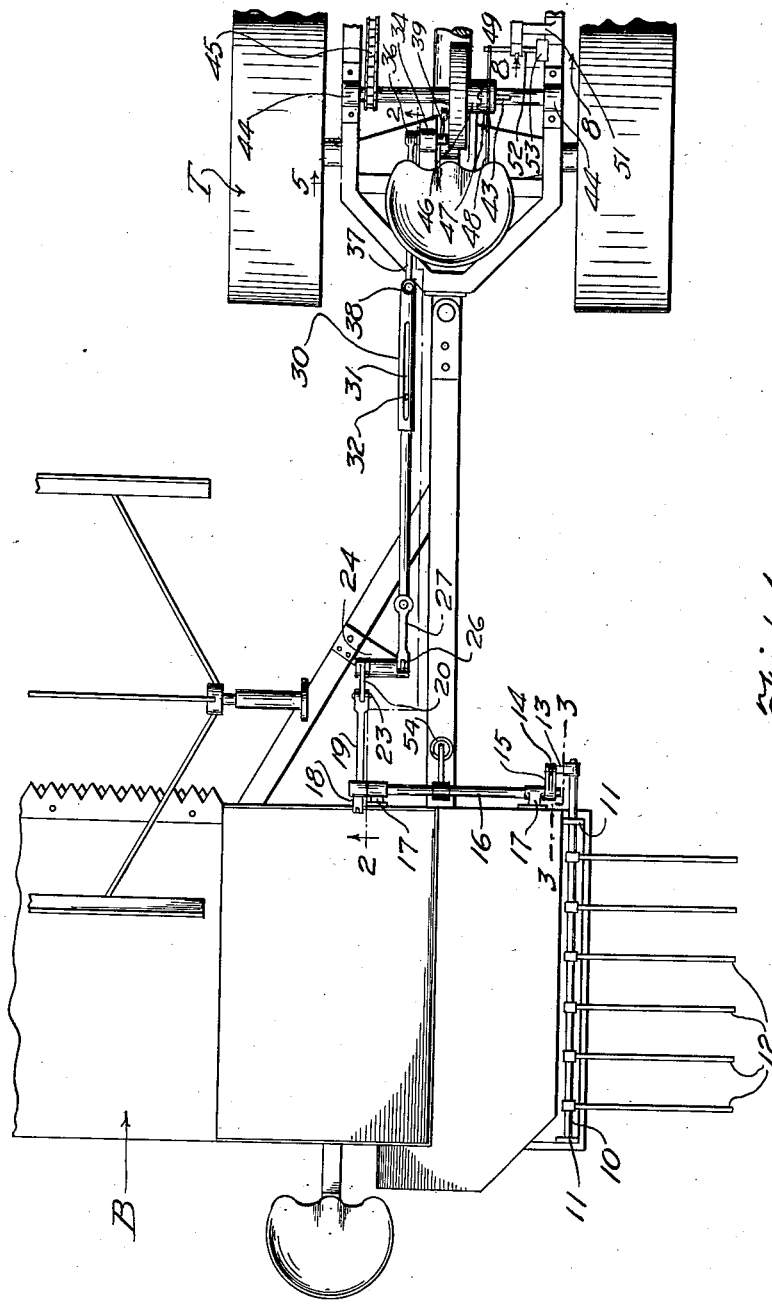
Fig. 1 is a general plan view showing a portion of a harvester of the usual reaper and binder form, a portion of an ordinary tractor and the invention as applied thereto.

In the embodiment of the invention as here shown there has been disclosed a portion of a binder indicated in general at B. Much of the detail construction of the binder has been omitted as having no relation to the present invention and as tending to obscure those parts directly relating to this invention. The illustration is, therefore, to be taken as merely typical of the general outline of a binder. Similarly a portion of a tractor has been shown at T with much of the detail omitted for like reasons.

The binder B is provided with a rock-shaft 10 supported in bearings 11 carried by any suitable parts of the binder. Fork tines 12 project from the shaft 10 in the usual manner and form the sheaf rack of the binder. This rack receives the sheaves until a sufficient number has been accumulated whereupon the shaft 10 is rocked to depress the free ends of the tines and the rack is dumped. In order to rock the shaft a rock arm 13 is fixed thereon and is connected by a link 14 with a second rock arm 15 fixed to a shaft 16 running across the front of the binder. The shaft 16 is supported in bearings 17 mounted on suitable parts of the binder. On its inner end the shaft 16 carries a rock arm 18 which is connected by a link 19 with a rock arm 20 fixed on a shaft 21. The rock arm 20 is provided with a series of pivot holes 22 and the link 19 has one end connected to the rock arm 20 by a pivot pin 23 passing through a selected hole 22. By this means, with a given angle of oscillation of the arm 20 the oscillation of the shaft 16 and thus of the shaft 10 may be regulated. The shaft 20 is supported in a bearing 24 mounted on a suitable part of the binder such as the tongue brace 25. On the shaft 20 is also fixed a rock arm 26 from which extends a link 27. Connected to the forward end of the link 27 is a link member 28, the joint 29 connecting these parts being such as to permit lateral swinging of the member 28. The forward end of the member 29 is received telescopically in a link member 30 of tubular construction. The member 30 is provided with a longitudinal slot 31 and fixed in the forward end of the member 28 is a pin 32 which slides in the slot 30 and limits the movement of the members 28 and 30 relative to each other. The pin 32 rests near in the rear end of the slot 31 except when turning of the tractor is desired.

Mounted on the tractor at some suitable place such as the frame 33 is a bearing 34 wherein is supported a shaft 35. On one end of this shaft 35 is fixed a rock arm 36 to which is connected one end of a link 37 which extends rearwardly from the arm 36. The forward end of the tubular member 30 and the rear end of the link 37 are connected by an upright joint 38 so that the member 30 may swing laterally with respect to the link 37. On the remaining end of the shaft 35 is fixed an actuating lever or arm 39 which carries means such as a roller pin 40 by which it may be power actuated. It is here to be understood that the actuating means now to be described is to be taken as typical of any suitable actuating means for the purpose and that the actuating means is not limited to that illustrated and specifically described.

As here shown the pin 40 fits in the cam groove 41 of a cam member 42 which is revolubly mounted on a shaft 43 journalled in bearings 44 mounted on the frame 33. This shaft is driven from the motor (not shown) of the tractor as by a chain 45. On the cam 42 is fixed a clutch member 46 which is engageable by a clutch member 47 splined on the shaft 43. The member 47 is moved by a shifter lever 48 which is connected by a rod or link 49 with the depending arm 50 of a bell crank lever pivoted to a bracket 51 mounted on the frame 33. The other arm 52 of this bell crank lever extends horizontally and carries a pedal or button 53 adapted to be depressed by the foot of the operator.

From the foregoing it will be seen that depression of the pedal 53 causes the clutch members 46 and 47 to engage. This clutches the cam 42 to the shaft 43 which is constantly revolving through the action of the motor. The operation of the clutch 42 actuates the arm 39 to urge its lower end rearwardly. This rocks the arm 36 forwardly and pulls on the link system formed by the members 37, 30, 28 and 27 so that the arms 26 and 20 rock forwardly and pull on the link 19. This rocks the shaft 16 which, as previously described, rocks the shaft 10 to dump the sheaf rack. Obviously, if desired suitable means such as a weight or spring 54 may be used to restore the sheaf rack if desired.

There has thus been provided a simple and efficient device of the kind described and for the purpose specified.

It is obvious that changes may be made in the form and construction of the invention without departing from the material principles involved. It is not therefore desired to confine the invention to the exact form herein shown and described but it is desired to include all forms which come within the scope of the appended claims.

What is claimed is:—

1. In a binder of the type having a sheaf rack movable between sheaf supporting and sheaf dumping positions, and a motor driven tractor attached to the binder; the combination of a linkage having one end connected to the sheaf rack for dumping the rack and having at its other end an actuating arm rockingly supported on the tractor, operating means for operating the actuating arm, and foot operated means on the tractor for connecting and disconnecting the operating means and the motor of the tractor.

2. In a binder of the type having a sheaf rack movable between sheaf supporting and sheaf dumping positions, and a motor driven tractor attached to the binder; the combination of a linkage having one end connected to the sheaf rack for dumping the rack and having at its other end an actuating arm rockingly supported on the tractor, operating means for operating the actuating arm, and foot operated means on the tractor for connecting and disconnecting the operating means and the motor of the tractor, said linkage including members pivotally connected by a joint having an upright axis permitting one member to swing laterally with respect to the other member.

3. In a binder of the type having a sheaf rack movable between sheaf supporting and sheaf dumping positions, and a motor driven tractor attached to the binder; the combination of a linkage having one end connected to the sheaf rack for dumping the rack and having at its other end an actuating arm rockingly supported on the tractor, operating means for operating the actuating arm, and foot operating means on the tractor for connecting and disconnecting the operating means and the motor of the tractor, said linkage including a pair of telescopically connected members, and means to limit separating movement of said telescopic members.

4. In a binder of the type having a sheaf rack movable between sheaf supporting and sheaf dumping positions, and a motor driven tractor attached to the binder; the combination of a linkage having one end connected to the sheaf rack for dumping the rack and having at its other end an actuating arm rockingly supported on the tractor, operating means for operating the actuating arm, and foot operated means on the tractor for connecting and disconnecting the operating means and the motor of the tractor, said linkage including a pair of telescopically connected members, and means to limit separating movement of said telescopic members, said telescopic members having their remote ends jointed to the remainder of the linkage by upright joints to permit laterally swinging of members connected by said joints relative to each other.

5. In a binder and a motor driven tractor connected to the binder, the combination of a binder supported sheaf rack having a rock shaft, a rock arm fixed on said shaft, a second rock shaft supported from the binder and extending at right angles to the first shaft, a rock arm on the second shaft, a link connecting said rock arms, a third rock arm on said second shaft, a third rock shaft carried by the binder parallel to the second shaft, a pair of rock arms on the third shaft, one of said pair of rock arms being provided with a longitudinally spaced series of pin openings, a second link having one end pivoted to the third rock arm and having its other end pin connected to a selected one of said openings, a fourth link connected at one end to remaining one of said pair of rock arms, a fourth shaft rockingly supported on the tractor, a second pair of rock arms carried by the fourth shaft, a fifth link having one end pivoted to an arm of the second pair of rock arms and extending rearwardly therefrom, a sixth link connected at its ends, operating means for actuating the second rock arm of the second pair, means for connecting and disconnecting the motor of the tractor and said operating means, and foot operated means for actuating the last mentioned means.

6. In a binder and a motor driven tractor connected to the binder, the combination of a binder supported sheaf rack having a rock shaft, a rock arm fixed on said shaft, a second rock shaft supported from the binder and extending at right angles to the first shaft, a rock arm on the second shaft, a link connecting said rock arms, a third rock arm on said second shaft, a third rock shaft carried by the binder parallel to the second shaft, a pair of rock arms on the third shaft, one of said pair of rock arms being provided with a longitudinally spaced series of pin openings, a second link having one end pivoted to the third rock arm and having its other end pin connected to a selected one of said openings, a fourth link connected at one end to remaining one of said pair of rock arms, a fourth shaft rockingly supported on the tractor, a second pair of rock arms carried by the fourth shaft, a fifth link having one end pivoted to an arm of the second pair of rock arms and extending rearwardly therefrom, a sixth link connected at its ends, said sixth link consisting of a pair of telescopically connected members and means to limit extension of said telescopic members, operating means for actuating the second rock arm of the second pair, means for connecting and disconnecting the motor of the tractor and said operating means, and foot operated means for actuating the last mentioned means.

CLAYTON B. WITTSTRUCK.